US008095622B1

(12) United States Patent
Hamor et al.

(10) Patent No.: US 8,095,622 B1
(45) Date of Patent: Jan. 10, 2012

(54) METHODS AND SYSTEMS FOR COLLECTING INFORMATION TRANSMITTED OVER A NETWORK

(75) Inventors: Alan Hamor, Pennington, NJ (US); Kenneth C. Tola, Jr., Chicago, IL (US); Earl K. Grant-Lawrence, Pearland, TX (US)

(73) Assignee: Campaignlocal, Inc., Pennington, NJ (US)

( * ) Notice: Subject to any disclaimer, the term of this patent is extended or adjusted under 35 U.S.C. 154(b) by 164 days.

(21) Appl. No.: 12/148,286

(22) Filed: Apr. 17, 2008
(Under 37 CFR 1.47)

Related U.S. Application Data

(60) Provisional application No. 60/912,203, filed on Apr. 17, 2007.

(51) Int. Cl.
*G06F 15/16* (2006.01)
(52) U.S. Cl. ..................................................... 709/218
(58) Field of Classification Search .................... 709/218
See application file for complete search history.

(56) References Cited

U.S. PATENT DOCUMENTS

| | | | |
|---|---|---|---|
| 6,728,767 B1 * | 4/2004 | Day et al. ....................... | 709/223 |
| 6,976,003 B1 * | 12/2005 | Hamor et al. .............. | 705/14.66 |
| 7,080,158 B1 | 7/2006 | Squire | |
| 7,562,153 B2 * | 7/2009 | Biliris et al. .................. | 709/238 |
| 7,734,722 B2 * | 6/2010 | Seidl et al. ..................... | 709/218 |
| 2001/0032259 A1 * | 10/2001 | Herrmann et al. ............ | 709/224 |
| 2003/0050920 A1 * | 3/2003 | Sun .................................. | 707/2 |
| 2003/0126248 A1 | 7/2003 | Chambers | |
| 2005/0228780 A1 * | 10/2005 | Diab et al. ........................ | 707/3 |
| 2008/0027809 A1 * | 1/2008 | Storm ............................. | 705/14 |
| 2009/0013089 A1 | 1/2009 | Sullivan et al. | |
| 2009/0083415 A1 | 3/2009 | Tola et al. | |
| 2009/0259666 A1 | 10/2009 | Tola et al. | |

OTHER PUBLICATIONS

Johns, Martin, Sabelfeld, Andrei, Meier, Jan, Gollmann, Dieter, SessionSafe: Implementing XSS Immune Session Handling, 2006, Springer Berlin / Heidelber, p. 444-460.*

* cited by examiner

*Primary Examiner* — Ajay Bhatia
(74) *Attorney, Agent, or Firm* — Charles A. Rattner

(57) ABSTRACT

The disclosure provides a transparent means of collecting context-dependent data nested in a client-server request/response paradigm. Through the use of an embedded web server, messages are terminated between the user and the disclosure wherein the disclosure takes on the role of a web server. The disclosure then initiates a new request, based on the content of the incoming request and submits this new message to a destination system. In this latter case, the disclosure is acting in the role of a web client. The response coming back from the destination system is then terminated at the disclosure which is still acting in the role of a web client. The content of the response is used to generate a new message which is sent back to the user. In this final phase, the disclosure is acting in the role of a web server. The purpose of this interaction is to capture website structure and function—mapped together is what it termed context-dependent information.

8 Claims, 8 Drawing Sheets

METHODS AND SYSTEMS FOR COLLECTING INFORMATION TRANSMITTED OVER A NETWORK

CROSS-REFERENCE TO RELATED APPLICATIONS

This application claims priority under 35 U.S.C. 119 to U.S. Provisional Patent Application Ser. No. 60/912,203 entitled "Methods and Systems for Collecting Information Transmitted over a Network" filed in the name of Hamor et al. on Apr. 17, 2007, the entirety of which is hereby incorporated by reference.

FIELD OF THE DISCLOSURE

The present disclosure relates generally to methods and systems for collecting information transmitted over a network.

BACKGROUND OF THE DISCLOSURE

Website data collection solutions can be separated into two general approaches. The first approach, called server-side, loads software onto the customer's server, for example, packet "sniffing" software and log file analysis software. This software collects many of the more common website statistics and is beneficial in storing the method used to transmit data (e.g. a GET or a POST). The second approach focuses on placing code on the client's computer to capture client interactions with a website. These client-side data collection solutions take a variety of forms such as code inserted on a page and text files (also known as "cookies") which are stored on the client's machine.

Unfortunately, both approaches suffer a number of drawbacks that make them nonviable options for comprehensive, transparent data collection. One major drawback of these approaches is that code has to be installed either on the customer's server, in the former case, or on the client's machine as in the latter case. Software compatibility issues, website growth constraints and customer/client time usage issues are all exacerbated by this requirement. These approaches also limit the complexity of a website. In the first approach, many solutions utilize cached web pages and they cannot support complex client-side scripting that forms the basis of many leading websites. The client-side approach, on the other hand, cannot adequately handle new interactions between the client and the server as they rely on static usage patterns to infer functionality. Finally, there is a growing need to track clients across related sites and this capability is beyond the scope of server-side solutions and only possible on client-side solution through the use of third-party cookies which are disabled in most current browsers. The inventors have recognized the drawbacks mentioned above and have provided systems and methods for collecting information transmitted over a network which overcome the disadvantages recited.

SUMMARY OF THE DISCLOSURE

The disclosure provides a data collection system configured to communicate with an originating system and a destination system via a network. The data collection system receives a message from the originating system. In one embodiment of the disclosure, the originating message (request) includes a Universal Resource Indicator (URI) that is used to determine a destination URI based on dynamic URI mappings, but other network location identifiers may also be included in a message.

DESCRIPTION OF THE DRAWING FIGURES

These and other objects, features and advantages of the disclosure will be apparent from a consideration of the following detailed description of the Disclosure considered in conjunction with the drawing Figures, in which.

DETAILED DESCRIPTION OF THE DISCLOSURE

In accordance with the present disclosure, sometimes referred to hereinafter as the Transparent Information Collection System ("TICS"), there are provided herein methods and systems for tracking messages transmitted over a network. The ability of the TICS to interject processing directly into the client-server stream allows the inventors to store, for the first time, both website structure and website function. Collecting this context-dependent data will provide significant new insights that scale beyond simple website tracking and reporting.

The TICS resolves the numerous challenges limiting current tracking approaches such as the following:

Code Intensive
 a. Issue: Many data collection solutions require extensive amounts of code on client or customer machines.
 b. Solution: The system and method of the TICS do not require code on either the client or customer machines.

Antiquated Inference Methods
 a. Issue: Classic server processing usage patterns, utilized by many tracking solutions to determine a lead, are no longer valid given new technical approaches to methods for processing originating requests.
 b. Solution: The TICS captures the actual lead information as part of its contextual data collection process, making the concept of determining function through inference obsolete.

Cross Domain Issues
  a. Issue: Without resorting to third-party cookies, classic data collection solutions have no means of tracking users across websites.
  b. Solution: Since the TICS acts as an embedded web server, it is capable of tracking across an unlimited number of websites without the use of cookies, or any other customer/client-side code.
Caching
  a. Issue: Some data collection solutions send cached versions of a customer's website in response to an originating request. This approach cannot support complex websites with advanced client-side functionality.
  b. Solution: When utilizing an embedded web server, no caching is required. In addition, by operating at the socket level, the dynamic requesting, parsing and HTML package creation is as fast as any other network hop in a request chain.
Browser Agnostic
  a. Issue: Using client-side JavaScript or server-side frames—as is the case in current data collection approaches—can lead to browser-dependency issues.
  b. Solution: The TICS places nothing on the client's browser that would affect the normal display, therefore there are no browser issues related to this tracking approach.

Figure 1:
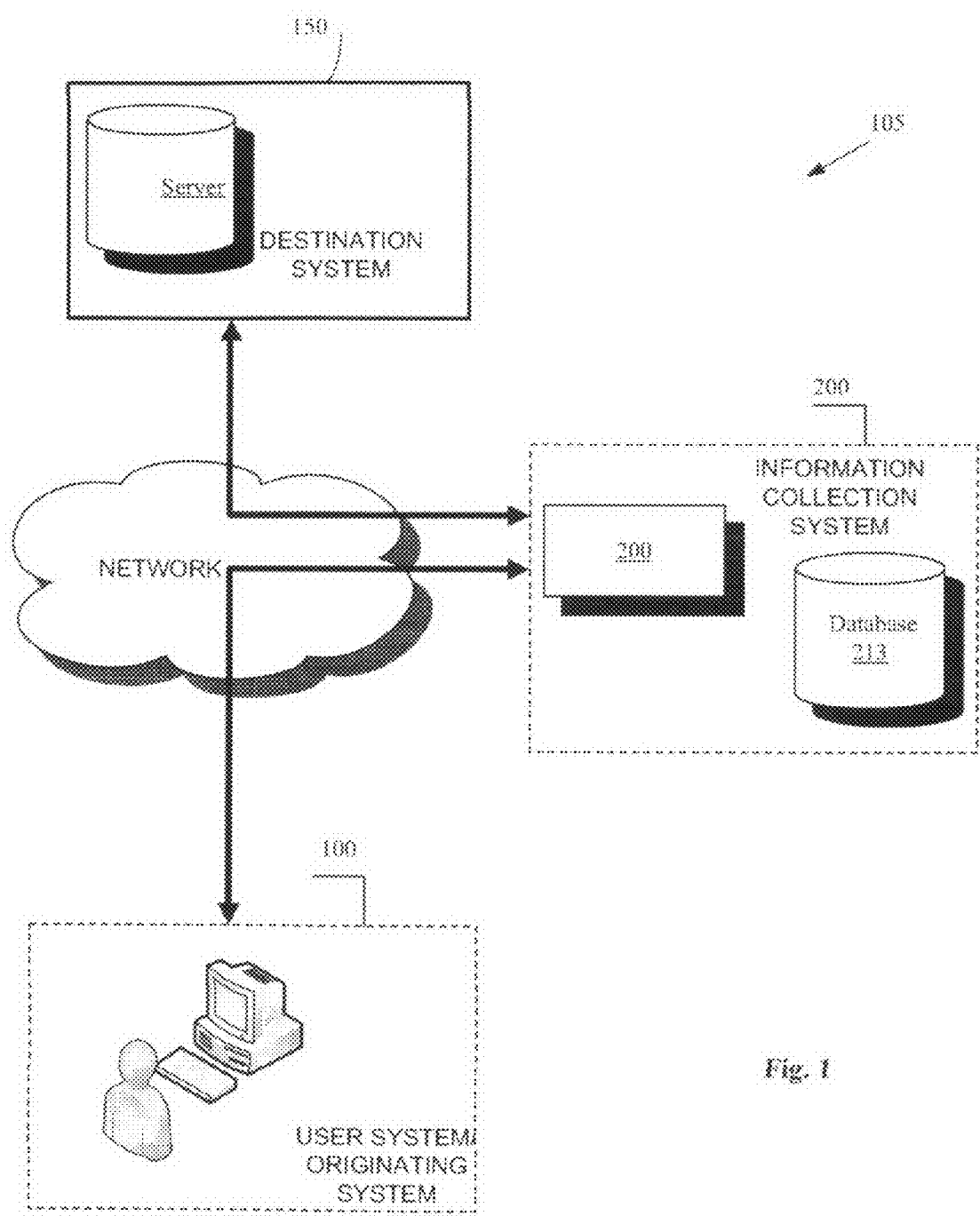
FIG. 1 is a system block diagram illustrating communications between the Originating, Data Collection and Destination Systems according to an embodiment of the disclosure.

FIG. 1 illustrates a network 105 including an information collection system 200. The information collection system 200 acts as a web server for the originating system 100 and fulfills originating requests by obtaining web responses from the destination system 150. In this latter web requests to the destination system 150, the information collection system 200 acts in the role of a web client. In one embodiment of the disclosure, the network 105 comprises the Internet. In another embodiment of the disclosure, the network 105 is selected from the group comprising: local area network (LAN) and wide area network (WAN). The disclosure is not limited to implementation in any specific network configuration and could include the use of any wireless or wired device operating in conjunction with satellite, microwave, fiber optic, copper, WIFI and WIMAX or other networks. It will find application in any type of system comprising interconnected computers configured to communicate with each other using messages transmitted electronically or via other means.

Figure 2:
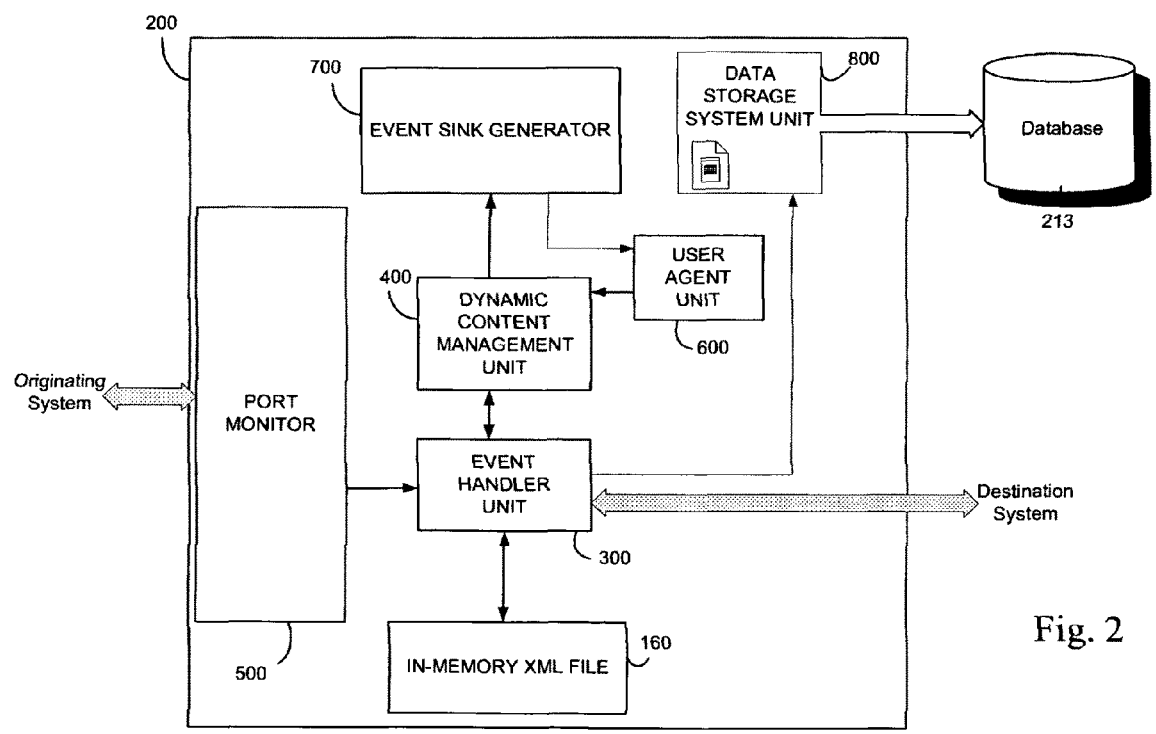
FIG. 2 is a block diagram illustrating components of the data collection system in accordance with an embodiment of the disclosure.

In one embodiment of the disclosure, information collection system 200 comprises a server or other suitable device configured to communicate with a message originating system 100 and a destination system 150. The data collection system 200 dynamically monitors messages transmitted from the originating system 100 intended for the destination system 150 and vice versa. To accomplish this, the data collection system 200 includes a Controller 250 as illustrated in FIG. 2.

Figures 3, 4:
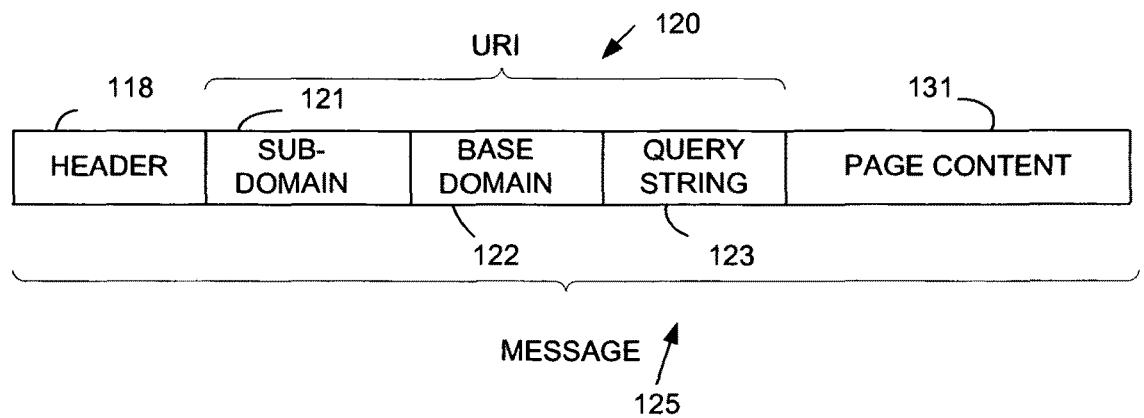
FIG. 3 illustrates generic subcomponents of a standard message.
FIG. 4 illustrates a conceptual URI look-up table/in-memory XML file.

In one embodiment of the TICs, data collection system 200 includes a map comprising sub-domain values 161 and their corresponding destination Uniform Resource Identifiers (URIs) 162 as illustrated in FIG. 4. In one embodiment of the disclosure, a map comprises a look-up table 160 contained in an in-memory XML file. The look-up table 160 illustrated in FIG. 4 is a conceptual representation showing the use of a sub-domain. As such, it does not indicate a specific number of entries, nor does it indicate all details of the entries. Exact implementations of look-up table 160 vary. In other embodiments of the disclosure, table 160 could comprise domain information whereby to collect information regarding entire domains. All of the variations are intended to remain within the scope of the disclosure.

The look-up table 160 comprises sub-domain entries 161. Each subdomain entry includes a value representing a corresponding destination domain URI. Corresponding URI values are indicated in table 160 at 162. A URI is used to identify a destination system 150. In accordance with an embodiment of the disclosure, a plurality of destination systems 150 of a network 100 are mapped to corresponding unique subdomain values 161 in table 160. Table 160 is stored in the information collection system 200. A mapped value for a destination sub-domain is referred to herein as a "destination domain".

In one embodiment of the disclosure, the map comprises an XML file comprising URIs. In another embodiment of the disclosure, the map comprises an XML file comprising destination Universal Resource Locators. In one embodiment of the disclosure, the map is stored in a memory of the information collection system 200. In another embodiment of the disclosure, the map is stored in a memory of the Controller 250.

FIG. 3 illustrates a general message configuration representative of a type commonly used to communicate via the Internet. Message 125 comprises a header portion 118, a URI portion 120 and a page content portion 131. URI portion 120 comprises a sub-domain portion 121, a base domain portion 122 and a query-string 123.

FIG. 2 illustrates a Controller 250 of the information collection system 200 illustrated in FIG. 1 according to an embodiment of the disclosure. Controller 250 comprises a Port Monitor Unit (PM) 500, a Dynamic Content Management Unit (DCMU) 400, an Event Sink Generator (ESG) 700, a Data Storage System Unit (DSSU) 800, an Event Handler Unit (EHU) 300, an in-memory XML File 160, and a User Agent (UA) 600. The controller 250 also communicates with a database 213.

Port Monitor Unit (PM) 500 is configured to sense binary streams comprising communication over a network. PM 500 monitors a port (e.g. port 80, 81, etc.) of information collection system 200 to detect network communications representing requests. One example of a request is a message transmitted from an originating system 100 (illustrated in FIG. 1) for information provided by a destination system 150. For example, according to an embodiment of the disclosure, the originating system 100 comprises a user computer. An example of a message from a user computer is a request by a user via originating system 100 for a web page provided by destination system. The user's request is directed to a server comprising information system 200. Note the user's request terminates at information collection system 200 though the information requested by the user resides on destination system 150. PM 500 detects the user's request and communicates the request to EHU 300.

Information collection system 200 generates a collection system request in response to a user request detected by PM 500. The information collection system request is transmitted from information collection system 200 to destination system 150. Destination system 150 responds to requests from information collection system 200. Destination system 150 directs its replies to requests from information collection system 200 in the form of a response, for example a synchronous response, to Event Handler Unit (EHU) 300.

EHU 300 is configured to communicate with PM 500, DCMU 400, an in-memory XML file 160, DSU 800 and the destination system 150. EHU 300 carries out a process referred to herein as Event Message Handling. The first step is to parse the subdomain from the incoming URI and to perform a look-up query from the in-memory XML file 160 for requests from the originating system 100. If the look-up results in a destination domain, then the incoming request and the destination domain are passed, in parallel, to the DCMU 400 and DSSU 800 by EHU 300. If the look-up does not result in a destination domain, the request is passed directly to the destination system 150 thereby by-passing collection and storage mechanisms of information collection system 200.

Figure 7:
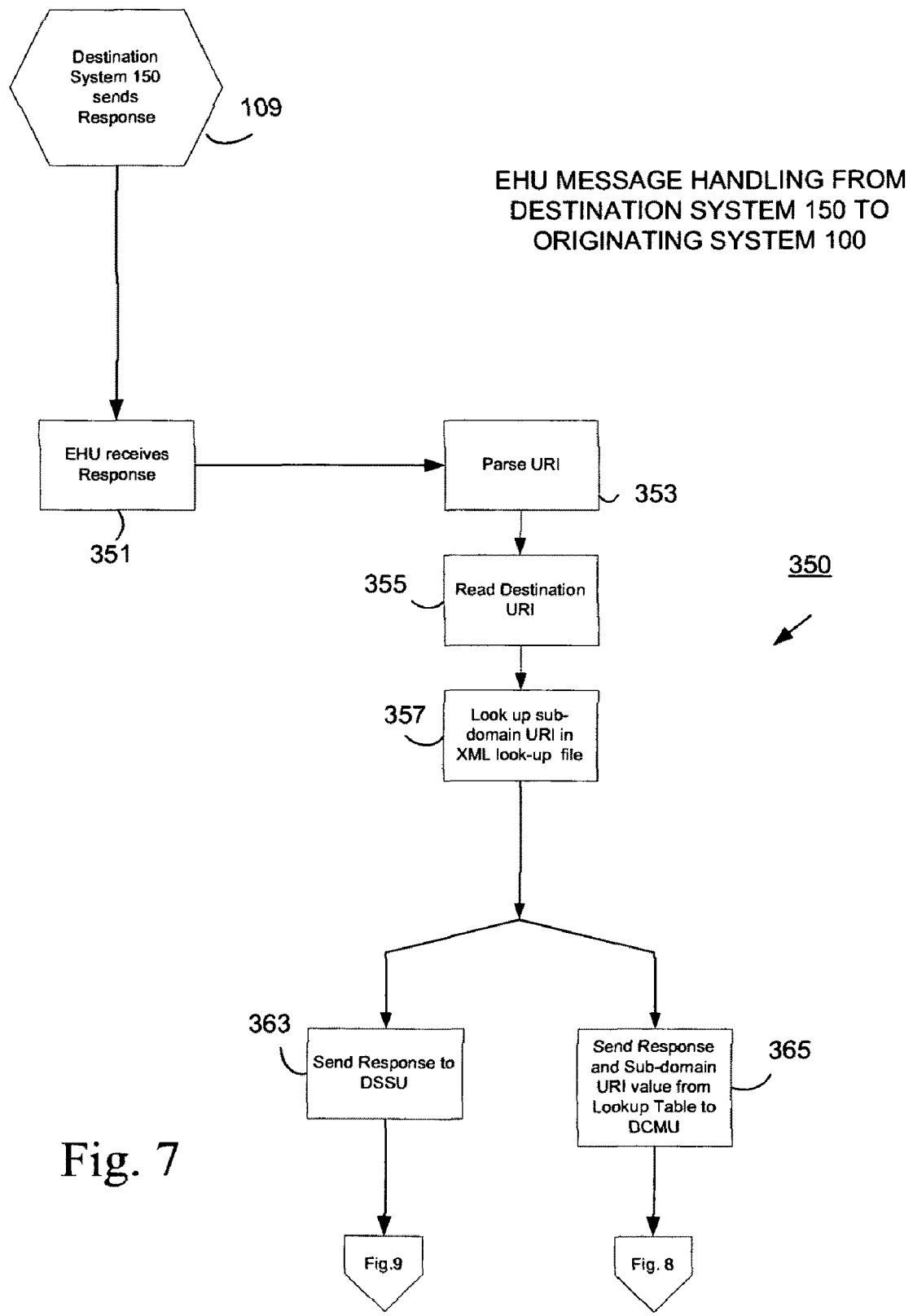
FIG. 7 is a flow chart illustrating event handling steps for a message transmitted from a destination system to the data collection system according to an embodiment of the disclosure.

For responses from the destination system 150, EHU parses the destination URI and uses the parsed destination URI to perform a lookup for the corresponding sub-domain value as described in FIG. 7.

Figure 5:
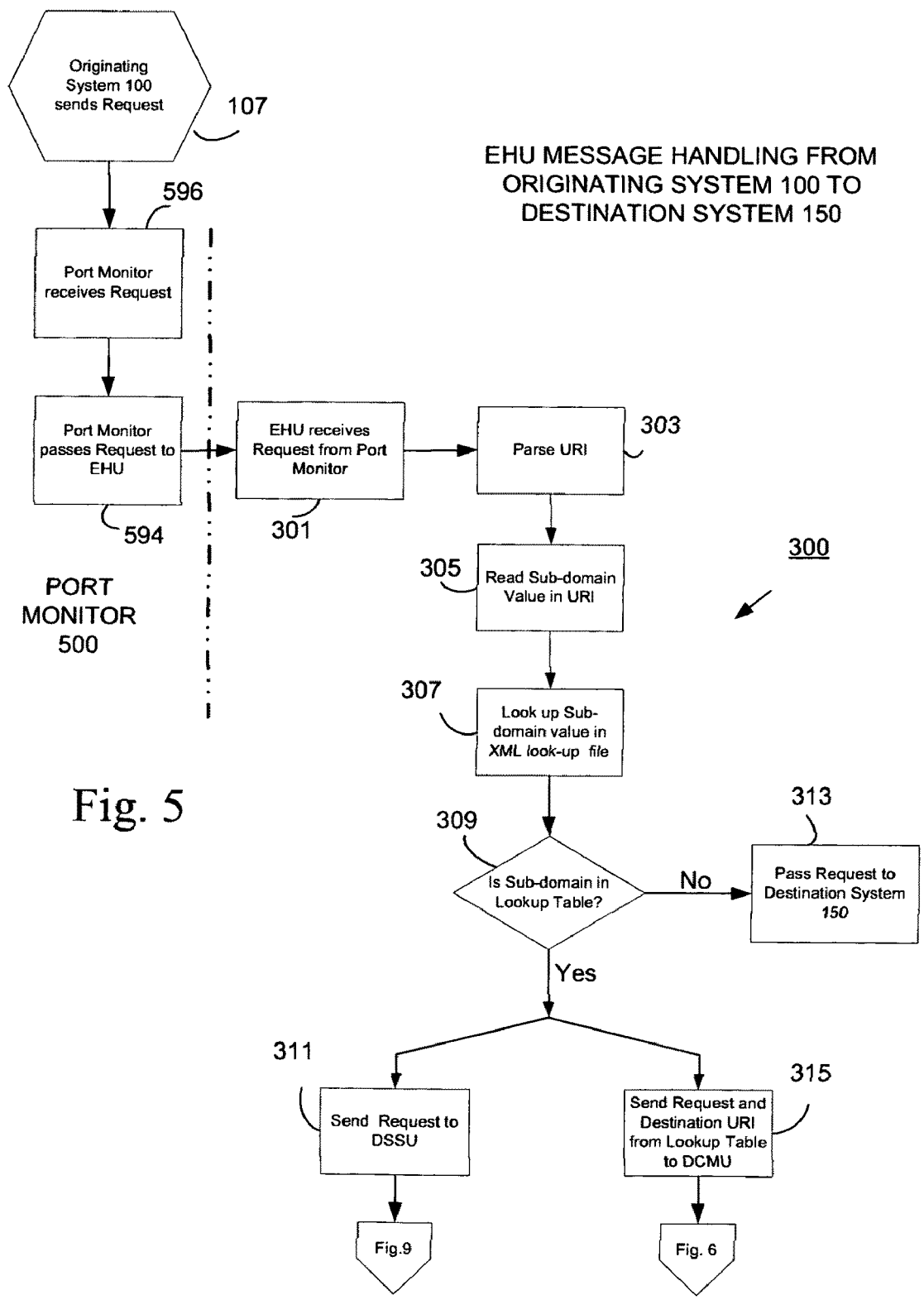
FIG. 5 is a flow chart illustrating event handling steps for a message transmitted from an originating system to the data collection system in accordance with an embodiment of the disclosure.

Referring to FIG. 5 EHU 300 receives from PM 500 a message representing a request from an originating system 100. In one embodiment of the disclosure, the request comprises a message of the general type illustrated in FIG. 3 at 125. EHU 300 evaluates the received request by parsing URI 120 of message 125 to identify a sub-domain value 121 (steps 303-307 of FIG. 5). EHU 300 determines if sub-domain 121 of message 125 corresponds to a monitored destination URI value.

If EHU 300 determines the sub-domain value in the URI has a corresponding destination URI (step 309 of FIG. 5) EHU 300 sends the message to dynamic content management unit (DCMU) 400 (FIG. 5 at step 315). In addition EHU 300 provides the message to DSSU 800 (FIG. 5 at step 311.) EHU 300 makes the determination based on the value of the destination domain. If the destination domain is not in the in-memory XML file 160, EHU 300 passes the message directly to the destination domain 150.

In a corresponding manner, EHU 300 receives from the destination system 150 a message representing a response transmitted by a destination system 150 in response to a request from the DCMU 400 of information collection system 200. In that case EHU 300 carries out steps illustrated in FIG. 7. EHU 300 obtains the sub-domain value for the message based on the destination URI in the response as indicated in steps 353 to 357 of FIG. 7. EHU 300 then provides the message to DSSU 800 and to DCMU 400.

DCMU 400 performs the general functions described below.
1. Content Retrieval
  i. The DCMU 400 uses the content of the incoming message as well as the value of the incoming URI to dynamically generate a new and distinct web request. This web request is sent to the destination system with the DCMU emulating a standard web client or originating system.
  b. The response from the destination domain 150 is captured and temporarily stored as an in-memory HTML package.
    i. The content of the response from the destination system is used to generate a new and distinct response to be sent back to the originating system.
    ii. Custom Headers are inserted to identify this message in subsequent transmissions.
  c. The base URI for all actionable components (e.g. JavaScript, Form Post Addresses, Hyperlinks, etc.) is modified to point back to the TICS and port monitored by the Port Monitor 500.
2. The Dynamic Response is Sent Back to the EHU 300.

Figure 6:
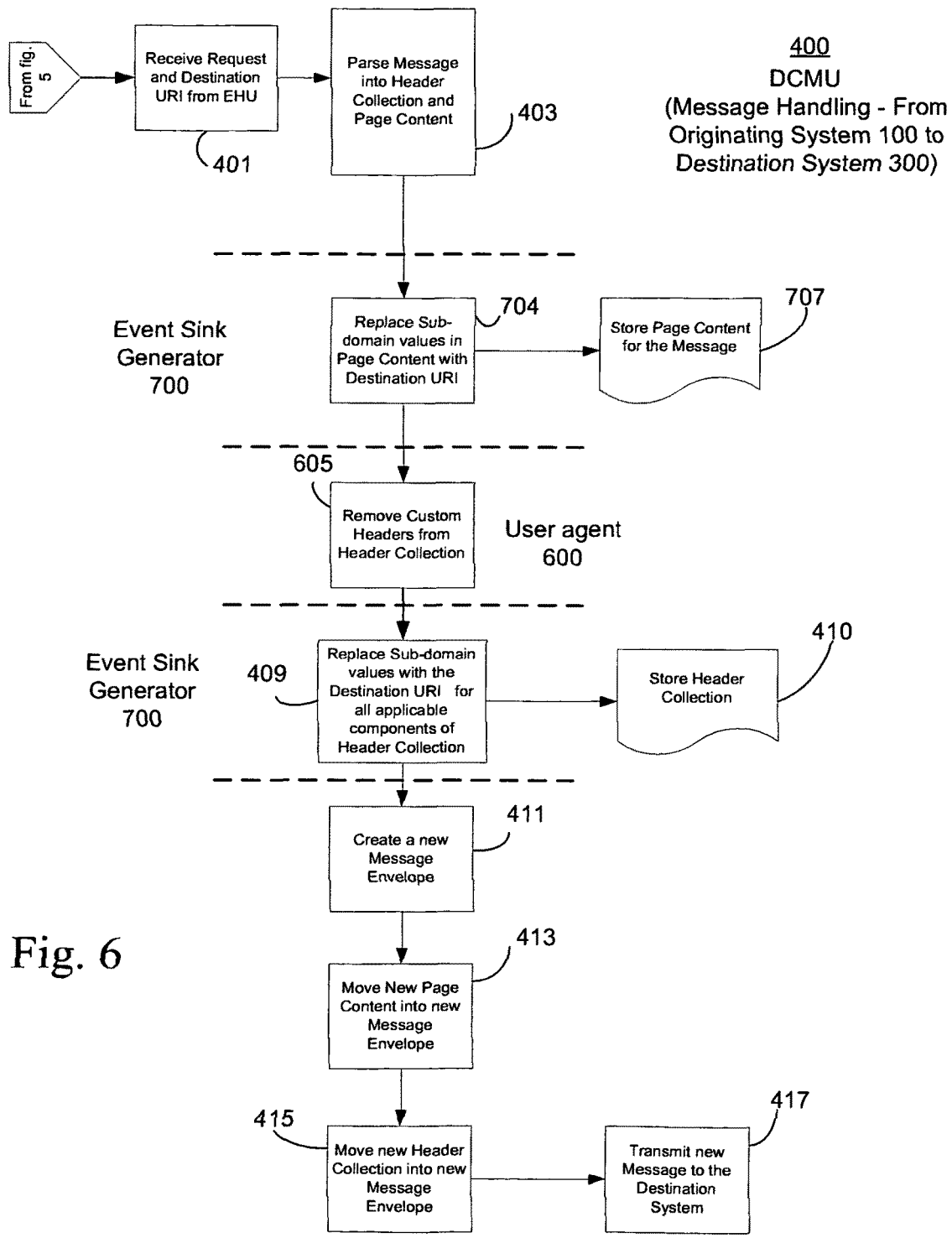
FIG. 6 is a flow chart illustrating dynamic content management steps for a message transmitted from an originating to the data collection system according to an embodiment of the disclosure.

FIG. 6 illustrates steps of a method carried out by DCMU 400 according to an embodiment of the disclosure. As indicated at 401 of FIG. 6, DCMU 400 receives a message and a destination URI from EHU 300. DCMU 400 parses the message into a header portion and a page content portion (indicated at 403). The header and page content portions are provided to ESG 700. ESG 700 replaces the SD value in the page content with the destination URI provided by EHU 300 (indicated at step 704 of FIG. 7). The message is provided to the user agent 600 as indicated in FIG. 6 at 605. User agent 600 removes custom headers from the header portion of the message and provides the message to ESG 700. ESG 700 replaces SD values in the header collection with the destination URI provided by EHU 300.

DCMU 400 creates a new message envelope as indicated at 411 of FIG. 6. DCMU 400 moves the page content provided by ESG 700 (at step 707) into the new message envelope (at 413). DCMU 400 moves the header collection provided by ESG 700 (at 410) into the new message envelope (415). The message is transmitted to destination 150 in the envelope provided by DCMU 400.

Figure 8:
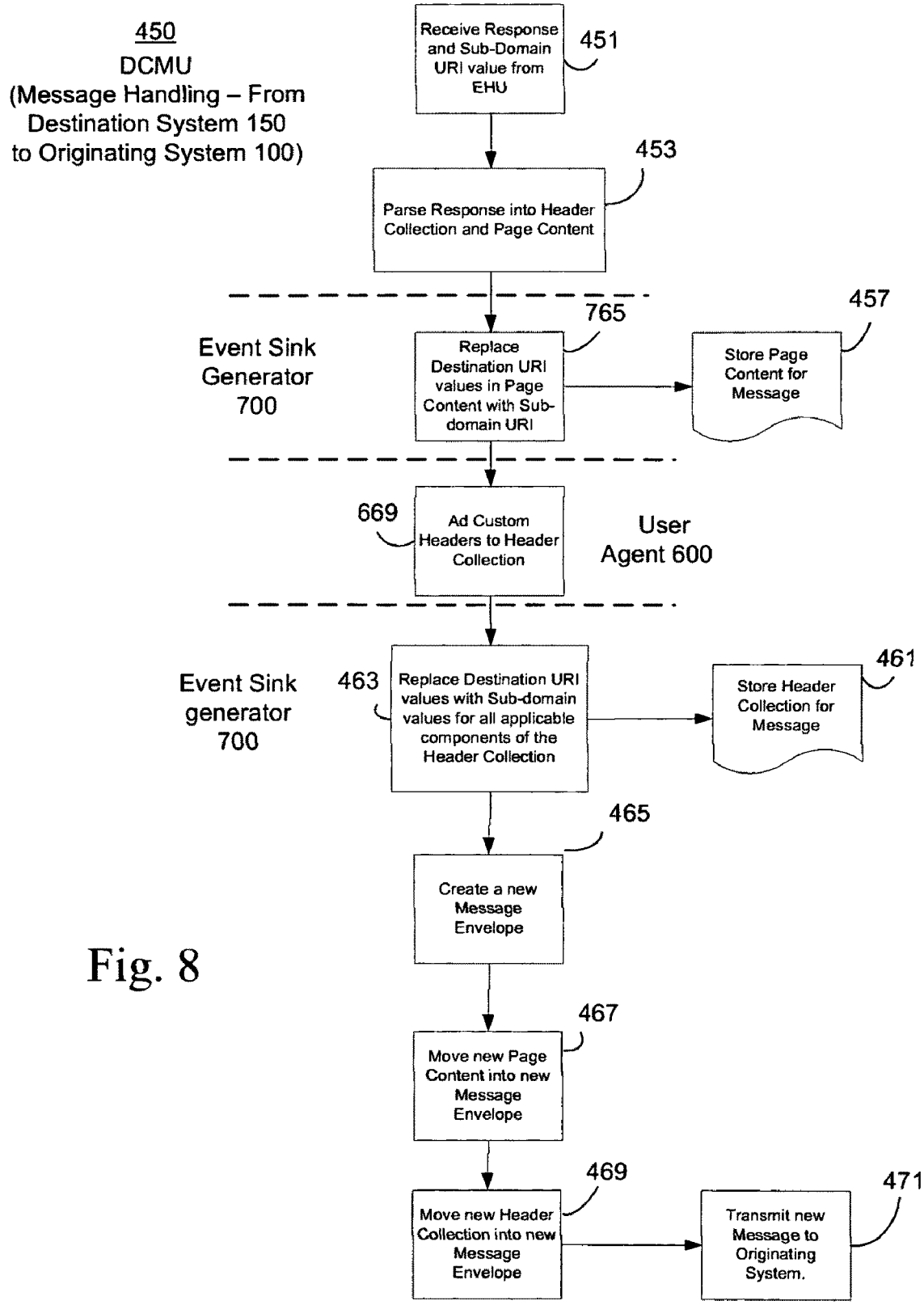
FIG. 8 is a flow chart illustrating dynamic content management steps for a message transmitted from a destination system to the data collection system according to an embodiment of the disclosure.

FIG. 8 illustrates a EHU process 300 for handling responses from a destination system 150. For responses, EHU 300 acts as a web client for the destination system 150 (e.g. a website). As illustrated in FIG. 8, the DCMU 400 process begins when DCMU 400 receives a message and a sub-domain URI value from EHU 300. DCMU 400 parses the responses into a header collection portion and page content portion (at 451 and 453). All destination URI values of the page content portion are modified by DCMU 400 such that the base URI points back to the information collection system 100 (at 765). Custom headers are added to the header collection (at 669) and a new message is created by DCMU 400. The page content and header collection information provided in steps 451-453 are moved into the new message and the DCMU 400 provides the resulting message to the EHU 300 (indicated at 465-471).

Event Sink Generator (ESG) 700 is coupled to DCMU 400. ESG 700 prepares the message to be properly handled by the system in the event of a response from the user. In one embodiment of the disclosure, ESG 700 performs the following functions.
1. Session Creation
  a. If a Session does not already exist for this message, a new Globally Unique Identifier (GUID) is generated and added to the Header Collection.
    i. The Session is queried from the header collection of the HTML Package.
    ii. The Session GUID is entered into the header collection for the HTML Package.
2. The Message is then Sent Back to EHU 300.

Figure 9:
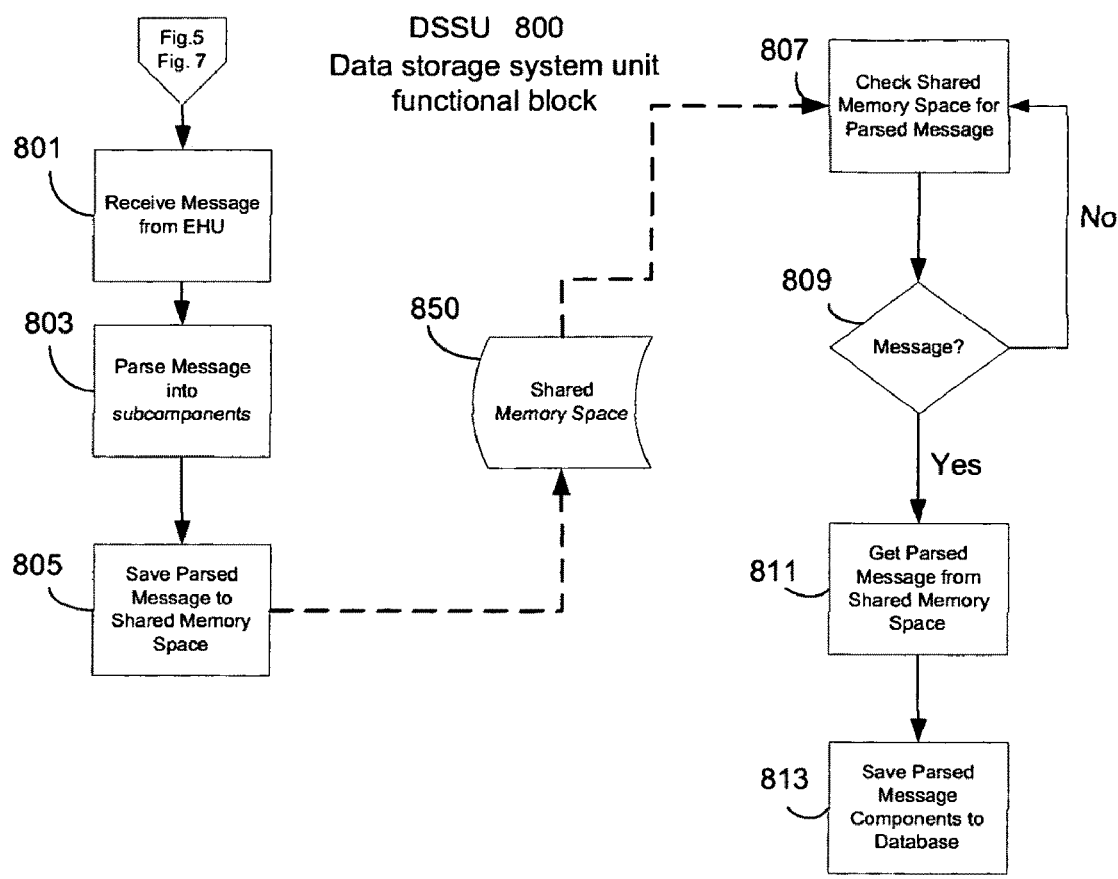
FIG. 9 is a flow chart illustrating steps for storing messages according to an embodiment of the disclosure.

Data Storage System Unit 800 (DSSU) stores information about a given request into a shared memory space (see FIG. 9 at 801-805) from which an independent process moves the data into a permanent data store (see FIG. 9 at 807-813). This process occurs through the following steps:
1. Session Determination
  a. The header collection is queried to determine that a Session exists.
  b. If a Session does not already exist for this message, a new Session GUID is generated.
  c. The Session GUID is entered into the header collection for the HTML Package.
2. Page Storage
  a. The in-memory XML file is then queried to determine whether or not to store all of the contents of the page.
  b. If the page needs to be stored, the context-dependent information (Header Collection, Page Content, Form Content, etc . . . ) are entered into a shared memory space along with the Session ID.
3. Action Storage
  a. An independent process reads the shared memory space (either tightlycoupled as in Global Memory or loosely-coupled as in a queue) and stores the parsed information in a permanent database (See FIG. 9).

FIG. 9 illustrates operations of DSSU 800 according to an embodiment of the disclosure. At 801 a message is received from EHU 300. The message is parsed into subcomponents (803). The parsed subcomponents are stored in a shared memory space 850. In one embodiment of the disclosure, shared memory is a shared system resource accessed by two or more processes. In another embodiment, shared memory is an asynchronous queuing/caching mechanism used to pass data. Shared memory 850 is continuously checked for stored parsed messages (807). When a parsed message is found in the shared memory space 850, the parsed message is retrieved from shared memory and written into a database 213.

User Agent unit 600 is manually created by developing a GET or POST command that points to the Controller. It is essential for the URI in the command to contain a valid destination sub-domain value in the base domain section. Outside of this rule, User Agent unit 600 is flexible. User Agent unit 600 has a wide variety of implementations. For example, user agent 600 can be implemented in SEM and Banner Ads, hyperlinks on websites, emails and submissions on various sites to name but a few possible implementations.

Thus Controller 200 implements a system for collecting information transmitted over a network. The information collection system communicates with an originating system over a network to receive a message having a URI from the originating system acting in the role of a web server. The information collection system determines a destination URI for the message based upon the incoming originating URI. The information collection system is configured to analyze the contents of the message and to generate a second message based on the results of the analysis of the first message. The information collection system stores the context-dependent components of the originating message in a parallel process while transmitting the second message to the destination URI acting in the role of a web client.

While the disclosure has been shown and described with respect to particular embodiments, it is not thus limited. Numerous modifications, changes and enhancements will now be apparent to the reader. This disclosure not only allows for novel forms of trending analysis and statistical research, it also answers the numerous challenges facing the current set of tracking solutions found in the industry.

What is claimed is:

1. A method for network event handling in an information collection system, comprising:
   receiving, from a computer device, a request including a Uniform Resource Identifier (URI) having a subdomain;
   parsing the subdomain from the incoming URI;
   performing a look-up query for the subdomain from an in-memory file comprising stored destination domains; and
   when the subdomain parsed from the URI of the request matches a stored destination domain, passing the request and the stored destination domain to a Dynamic Content Management Unit and a Data Storage System, such that the Dynamic Content Management Unit retrieves information corresponding to the request from a domain corresponding to the stored destination domain, inserts a custom header for tracking transmissions regarding the request, and transmits the information with the custom header to the computer device, and the Data Storage System stores the retrieved information from the domain and stores tracking statistics corresponding to all subsequent transmissions regarding the request and the domain; and
   when the subdomain parsed from the URI of the request does not match a stored destination domain, passing the request directly to a destination domain in the request, thereby by-passing the Dynamic Content Management Unit, and for which no tracking statistics are stored in the Data Storage System regarding the request.

2. A system for obtaining and storing information transmitted over a data network including a computer device having a first network location that is capable of transmitting information to and receiving information from a computer server having a second network location on the data network;
   a transparent information collection server (TICS) that is situated between the first and second network location on the data network, said transparent information collection system operative to:
      receive a first transmission from the computer device over the data network, the first transmission including a request directed to a subdomain of the computer server;
      send a second transmission to the computer server where said second transmission is based on the request within the first transmission;
      receive content from the computer server in response to the request;
      adding, to the content, at least one custom header having a tracking value for tracking transmissions between the computer device and the computer server relating to the request;
      transmit the content with the at least one custom header to the computer device over the data network based on the second transmission received from the computer server such that the custom header and the TICS are transparent to the computer device;
   store the first and second transmissions and at least a portion of the content transmitted between the computer device and the computer server into a memory with the tracking value, and further transmit and store a series of subsequent transmissions between the computer device and the computer server over the data network, which correspond to the request, whereby such subsequent transmissions are tracked without placing tracking code on the computer device from the TICS.

3. The system of claim 2 wherein the transparent information collection system acts on behalf of the computer device when sending transmissions to the computer server.

4. The system of claim 2 wherein the transparent information collection system acts on behalf of the computer server when sending transmissions to the computer device.

5. The system of claim 2 wherein said memory comprises at least one of a file on a file system and a record in a database.

6. The system of claim 2 where the at least one custom header comprises one or more hyperlinks.

7. The system of claim 2 wherein said memory further comprises a list of network locations that can be monitored by the transparent information collection system.

8. The system of claim 7 wherein transmissions received from the computer device are compared to said list of network locations to be monitored whereby when the computer server identified by the first transmission is not in the list of network locations then the first transmission is forwarded directly to the second network location, the tracking value is not inserted and subsequent transmissions between the computer device and the computer server are not stored by the TICS.

* * * * *